US009131127B2

(12) United States Patent
Zheng et al.

(10) Patent No.: US 9,131,127 B2
(45) Date of Patent: Sep. 8, 2015

(54) METHOD AND APPARATUS FOR RECONSTRUCTING MOTION COMPENSATED VIDEO FRAMES

(71) Applicant: ATI Technologies ULC, Markham, Ontario (CA)

(72) Inventors: Yubao Zheng, Markham (CA); Zingping Cao, Markham (CA)

(73) Assignee: ATI TECHNOLOGIES, ULC, Markham, Ontario (CA)

( * ) Notice: Subject to any disclaimer, the term of this patent is extended or adjusted under 35 U.S.C. 154(b) by 343 days.

(21) Appl. No.: 13/762,472

(22) Filed: Feb. 8, 2013

(65) Prior Publication Data

US 2014/0226070 A1   Aug. 14, 2014

(51) Int. Cl.
*G09G 5/00* (2006.01)
*H04N 5/21* (2006.01)
*G06T 5/00* (2006.01)

(52) U.S. Cl.
CPC . *H04N 5/21* (2013.01); *G06T 5/005* (2013.01)

(58) Field of Classification Search
None
See application file for complete search history.

(56) References Cited

U.S. PATENT DOCUMENTS

| 5,682,205 A * | 10/1997 | Sezan et al. | 348/452 |
| 2004/0150747 A1* | 8/2004 | Sita | 348/558 |
| 2005/0265608 A1* | 12/2005 | Suino | 382/233 |
| 2006/0257042 A1* | 11/2006 | Ofek et al. | 382/255 |
| 2010/0231797 A1* | 9/2010 | Jiang et al. | 348/607 |

* cited by examiner

*Primary Examiner* — Ryan R Yang
(74) *Attorney, Agent, or Firm* — Faegre Baker Daniels LLP

(57) ABSTRACT

A method and apparatus is provided for reconstructing video frames that include missing pixels as a result of video stabilization techniques to compensate for camera movement and/or zooming. In one example, the method and apparatus caches transformed frames of video, identifies coordinates of missing pixels in a current transformed frame, and sequentially processes, for only the missing pixel coordinates, the cached transformed frames in reverse chronological order to identify pixels at coordinates in the cached transformed frames having valid data and corresponding to one of the missing pixel coordinates. Upon identifying a pixel having valid data at a coordinate in a cached transformed frame corresponding to a missing pixel coordinate, the method and apparatus inserts the valid data at the missing pixel coordinate.

27 Claims, 10 Drawing Sheets

METHOD AND APPARATUS FOR RECONSTRUCTING MOTION COMPENSATED VIDEO FRAMES

BACKGROUND OF THE DISCLOSURE

The disclosure relates generally to a method and apparatus for reconstructing video frames that include missing pixels as a result of video stabilization techniques.

Videos captured using video cameras which are unstable, either as a result of movement of a human hand supporting the camera or movement of another supporting structure such as a helicopter or other mobile platform, typically suffer from significant image motion or shaking. The undesirable motion may result from camera displacement (i.e., vertical and/or lateral motion), rotation, and/or zooming. Mechanical methods of camera stabilization cannot entirely eliminate the undesirable motion, and are typically very expensive to employ. Thus, software implemented video stabilization or motion compensation techniques are frequently used in video playback and/or processing devices wherein the frames of video are transformed to eliminate unintended image movement due to camera displacement, rotation and/or zooming. Unfortunately, as a result of this transformation, areas in the transformed frames may include missing pixels, often around the borders of the frames for reasons described below.

Various approaches exist for reconstructing the missing pixels in video frames that have been transformed to compensate for undesired camera motion. One approach includes frame zooming or cropping, wherein the transformed frames are reduced in size such that the missing pixels in border areas of the frames are eliminated from the outputted frames. Using this approach, however, also results in a loss of content along the border areas of the frames, as well as a reduction in image resolution.

In another approach, sometimes referred to as pixel mirroring or border extension, missing pixels along a border of a frame are filled in using adjacent pixels in the image or by repeating pixels at the image border to the edge of the frame. While blank areas in the transformed frames are filled using this approach, the content used for the missing pixels is not representative of the actual image, and visible artifacts are typically produced.

In yet another approach, image mosaics are constructed by accumulating neighboring frames and stitching areas from those frames over the missing areas in a current frame. This mosaicing or image stitching produces good results for static scenes, but, due to the geometric transformation model typically employed, generates visible artifacts such as unnatural discontinuities when used for dynamic scenes.

Finally, another approach called exhaustive searching requires storage of a long history of past frames and includes a comparison of all pixels in a current frame to all of the pixels in preceding frames to substitute pixels in prior frames for missing pixels in the current frame. This approach can provide satisfactory image reconstruction, but it requires significant storage capacity, very high processing power and relatively long processing time. Consequently, the exhaustive search approach is cost prohibitive for some applications from a memory and processing standpoint, and cannot be used to perform real-time video reconstruction.

Accordingly, there exists a need for an improved method and apparatus for reconstructing motion compensated video frames that addresses one or more of the above-noted drawbacks.

SUMMARY OF EMBODIMENTS OF THE DISCLOSURE

According to one embodiment of the present disclosure, a method is provided for reconstructing video frames that include missing pixels as a result of video stabilization techniques to compensate camera movement and/or zooming. In one embodiment, the method includes caching transformed frames of video, identifying coordinates of missing pixels in a current transformed frame, and processing, for only the missing pixel coordinates, the cached transformed frames to identify pixels at coordinates in the cached transformed frames having valid data corresponding to one of the missing pixel coordinates. Upon identifying a pixel having valid data at a coordinate corresponding to a missing pixel coordinate, the method includes inserting the valid data at the missing pixel coordinate. In one aspect of this embodiment, the cached transformed frames are processed sequentially, and in a further aspect they are processed sequentially in reverse chronological order. In another aspect of this embodiment, caching transformed frames further includes caching corresponding transform matrices used to transform the transformed frames. In another aspect, sequentially processing further includes using, for each cached transformed frame processed, a corresponding cached transform matrix in an affine transformation to identify pixels at original coordinates in the cached transformed frames having valid data and corresponding to one of the missing pixel coordinates. When a pixel having valid data corresponding to a missing pixel coordinate at an original coordinate in the cached transformed frame is identified, the method includes inserting the valid data at the missing pixel coordinate.

In another aspect of this embodiment, the method further identifies missing pixel coordinates in the cached transformed frames and flags the missing pixels to identify pixels not including valid data. In yet another aspect of this embodiment, the missing pixels are flagged before the transformed frames are cached.

In yet another aspect of this embodiment, the method further maintains a count of cached transformed frames processed for the current transformed frame, and discontinues sequential processing when the count reaches a limit. In another aspect of this embodiment, the method mirrors pixels from the current transformed frame to reconstruct any missing pixels at missing pixel coordinates remaining after the count limit is reached.

Another embodiment of the present disclosure provides a computer-readable storage medium storing instructions that, when executed by one or more processors in a device for reconstructing video frames, cause the one or more processors to cache transformed frames of video, identify coordinates of missing pixels in a current transformed frame, and process, for only the missing pixel coordinates, the cached transformed frames to identify pixels at coordinates having valid data and corresponding to one of the missing pixel coordinates. Upon identifying a pixel having valid data at a coordinate in a cached transformed frame corresponding to a missing pixel coordinate, the instructions cause the one or more processors to insert the valid data at the missing pixel coordinate. In one aspect of this embodiment, the cached transformed frames are processed sequentially, and in a further aspect they are processed sequentially in reverse chronological order. In another aspect of this embodiment, the instructions further cause the one or more processors to cache corresponding transform matrices used to transform the transformed frames to compensate for the camera movement and/or zooming. In another aspect of this embodiment, the instructions further cause the one or more processors to use, for each cached transformed frame processed, a corresponding cached transform matrix in an affine transformation to identify pixels at original coordinates in the cached transformed frames having valid data and corresponding to one of the missing pixel coordinates. Upon identifying a pixel having valid data at an original coordinate in the cached transformed frame corresponding to a missing pixel coordinate, the valid data is inserted at the missing pixel coordinate.

In another aspect of this embodiment, the instructions further cause the one or more processors to identify missing pixel coordinates in the cached transformed frames and flag the missing pixels to identify the missing pixels as not including valid data. In yet another aspect of this embodiment, the instructions further cause the one or more processors to flag the missing pixels before caching the transformed frames.

In yet another aspect of this embodiment, the instructions further cause the one or more processors to maintain a count of cached transformed frames processed for the current transformed frame, and discontinue sequentially processing cached transformed frames when the count reaches a limit. In another aspect of this embodiment, the instructions further cause the one or more processors to mirror pixels from the current transformed frame to reconstruct any missing pixels at missing pixel coordinates remaining after the count limit is reached.

Still another embodiment of the present disclosure provides an apparatus for performing motion compensation on video frames. The apparatus includes a video input, a memory, a video output, and processing circuitry operative to receive frames of video from the video input, apply transform matrices to the received frames to produce motion stabilized transformed frames, cache the transformed frames in the memory, reconstruct missing pixels in a current transformed frame, and provide the reconstructed current transformed frame to the video output. In one example of this embodiment, the processing circuitry reconstructs the missing pixels by identifying coordinates of missing pixels in the current transformed frame, and processing, for only the missing pixel coordinates, the cached transformed frames to identify pixels at coordinates in the cached transformed frames having valid data and corresponding to one of the missing pixel coordinates. Upon identifying a pixel having valid data at a coordinate in a cached transformed frame corresponding to a missing pixel coordinate, the processing circuitry inserts the valid data at the missing pixel coordinate. In one aspect of this embodiment, the cached transformed frames are processed sequentially, and in a further aspect they are processed sequentially in reverse chronological order. In another aspect of this embodiment, the processing circuitry caches corresponding transform matrices used to produce the motion stabilized transformed frames to compensate for camera movement and/or zooming. In another aspect of this embodiment, the processing circuitry reconstructs the missing pixels by using, for each cached transformed frame processed, a corresponding cached transform matrix in an affine transformation to identify pixels at original coordinates in the cached transformed frames having valid data and corresponding to one of the missing pixel coordinates. Upon identifying a pixel having valid data at an original coordinate in the cached transformed frame corresponding to a missing pixel coordinate, the processing circuitry inserts the valid data at the missing pixel coordinate.

In another aspect of this embodiment, the processing circuitry identifies missing pixel coordinates in the cached transformed frames and flags the missing pixels to identify the missing pixels as not including valid data. In yet another aspect of this embodiment, the processing circuitry flags the missing pixels before caching the cached transformed frames.

In yet another aspect of this embodiment, the processing circuitry maintains a count of cached transformed frames processed for the current transformed frame, and discontinues sequentially processing the cached transformed frames when the count reaches a limit. In another aspect of this embodiment, the processing circuitry mirrors pixels from the current transformed frame to reconstruct any missing pixels at missing pixel coordinates remaining after the count limit is reached.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, a method and apparatus is provided for reconstructing video frames that include missing pixels as a result of video stabilization techniques to compensate for camera movement and/or zooming. The method and system permits storage of a relatively small number of cached transformed frames, thereby saving cost on memory space. Additionally, as the method and apparatus processes cached transformed frames to reconstruct only the missing pixels in a current transformed frame, relatively small processing power is required, and real-time processing of video frames is possible using relatively inexpensive processing devices. Additionally, the reduced memory required and reduced amount of processing required, compared to, for example, the exhaustive search approach, results in lower power consumption. Finally, loss of video content is minimized.

In one example, the method and apparatus includes caching transformed frames of video, identifying coordinates of missing pixels in a current transformed frame, and sequentially processing, for only the missing pixel coordinates, the cached transformed frames in reverse chronological order.

The sequential processing includes identifying pixels at coordinates in the cached transformed frames having valid data and corresponding to one of the missing pixel coordinates. Upon identifying a pixel having valid data at a coordinate in a cached transformed frame corresponding to a missing pixel coordinate, the method and process inserts the valid data at the missing pixel coordinate. This approach is continued until the current transformed frame is reconstructed, or until no more cached transformed frames are available for processing.

In other embodiments, the processing of the cached transformed frames is not performed in reverse chronological order. For example, it is considered within the scope of the disclosure to process the cached transformed frames from oldest to newest as a way of implementing a Least Recently Used cache replacement policy in combination with searching for missing pixels. Additionally, the processing of the cached transformed frames need not be performed sequentially. In some embodiments, where highly parallel processing hardware is available and power consumption is not a primary concern, all of the cached transformed frames may be processed in parallel, thereby providing a very rapid frame reconstruction.

Figure 1:
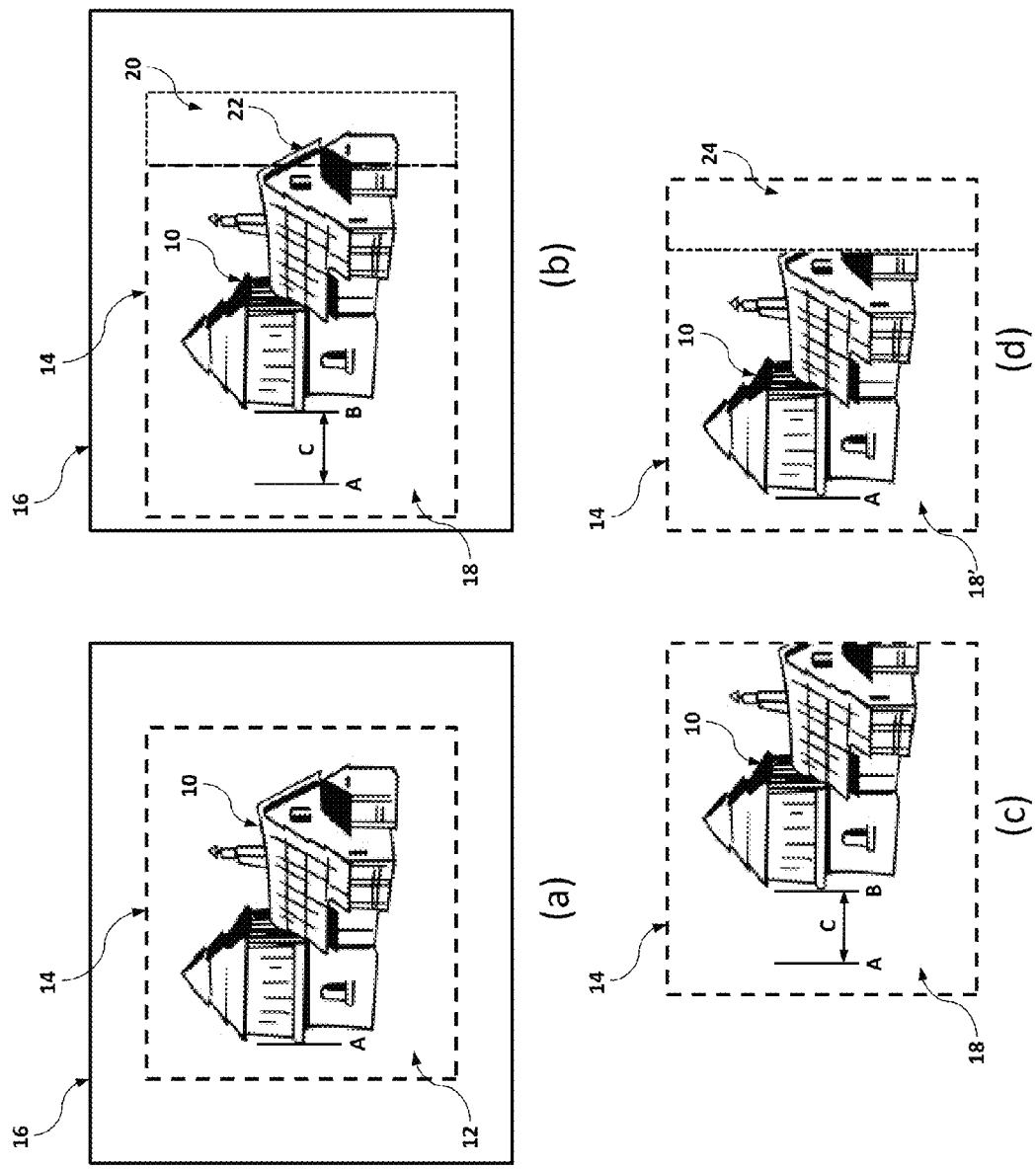
FIGS. 1(a)-(d) depict a basic motion compensation process applied to an image captured during undesirable camera motion.

A simple example of missing pixels resulting from frame transformation to compensate for undesired camera motion is depicted in FIGS. 1(a)-(d). In FIG. 1(a), a structure 10 is captured as an image frame 12 within the viewing area 14 of a camera aimed, for example, out of a fixed window 16. As shown, in frame 12 a left edge of structure 10 is at position A relative to the left edge of viewing area 14. In FIG. 1(b), a second image frame 18 is captured within viewing area 14, but viewing area 14 has been suddenly shifted or displaced to the left (i.e., closer to the left edge of fixed window 16). As shown, in frame 18 the left edge of structure 10 is at position B relative to the left edge of viewing area 14, which represents a displacement relative to position A of distance C. As such, area 20, which was included within frame 12 of FIG. 1(a), is not included in second frame 18 of FIG. 1(b). Consequently, the right-most portion 22 of structure 10 is not captured as part of second frame 18.

FIG. 1(c) shows second frame 18 before motion correction transformation. As should be apparent from comparing frame 12 of FIG. 1(a) and second frame 18 of FIG. 1(c), if the video including these frames were played back without motion correction, structure 10 would appear to suddenly jump from its position in the center of frame 12 to the right-shifted position of frame 18. This would appear to the viewer as a manifestation of camera shaking. Accordingly, to prevent such shaking in the video playback, second frame 18 is transformed in this example to the transformed frame 18' of FIG. 1(d). In this simple transformation, all of the pixels in frame 18 are shifted to the left by distance C. As shown, the left edge of structure 10 is shifted back to position A in transformed frame 18'. However, as portion 22 of structure 10 was not captured within viewing area 14 in second frame 18 (FIG. 1(b)), when structure 10 is shifted to its transformed position in transformed frame 18', the pixels forming portion 22 of structure 10 are missing. In fact, all pixels at the right border area 24 of transformed frame 18' are missing.

If video including frame 12 and transformed frame 18' were played back without reconstruction of transformed frame 18', structure 10 would not appear to jump from the center of frame 12 to the right in frame 18', but portion 22 of structure 10 would appear to momentarily disappear. The present disclosure provides for correction of this type of artifact of motion compensation. It should be understood that this simple example of lateral camera displacement is only illustrative. Sudden camera displacement in other directions, sudden camera rotation, sudden inward or outward zooming, and combinations of the same all may result in motion compensated transformed frames having areas of missing pixels.

FIGS. 2(a)-(f) depict cached transformed frames according to the present disclosure. FIG. 2(a) depicts the oldest cached transformed frame 26, and FIG. 2(f) depicts the most recent or current transformed frame 48, with the frames of FIGS. 2(b)-(e) being spaced in time between frame 26 and frame 48. As shown, frame 26 includes structure 10 which appears complete and substantially centered in frame 26. Additionally, a bird is shown flying near the left tower of structure 10. In FIG. 2(b), transformed frame 28 has been motion corrected to compensate for a sudden movement of a camera to the left, which resulted in an area 30 of missing pixels on the right border of frame 28. The bird is shown at a different position in its flight path relative to structure 10. In FIG. 2(c), transformed frame 32 is even more severely motion corrected to compensate for a continued sudden movement of the camera to the left relative to its position when capturing the image depicted in transformed frame 28. Consequently, transformed frame 32 includes an even larger area 34 of missing pixels, which includes missing pixels for substantially all of the small extension of structure 10 shown in the foreground of frame 26 (FIG. 2(a)). The bird is shown at a different position which is nearly out of the viewing area of the camera. In FIG. 2(d), transformed frame 36 has been transformed to compensate for undesired lateral camera motion, although the camera has moved slightly to the right resulting in fewer missing pixels in area 38 along the right border of frame 36 than in area 34 of frame 32 (FIG. 2(c)). Additionally, transformed frame 36 has been transformed to compensate for undesired vertical movement of the camera downwardly, which resulted in missing pixels in area 40 along the top border of frame 36. Next, transformed frame 42 of FIG. 2(e) is even more severely motion corrected to compensate for continued downward movement of the camera, but less motion corrected laterally as the camera continues to move to the right relative to its position when capturing the image of transformed frame 36. Accordingly, missing pixel area 46 is larger than area 40 and missing pixel area 44 is smaller than area 38. Finally, in FIG. 2(f), transformed frame 48 includes missing pixel areas 50 and 52 which result from motion compensation for continued downward and rightward movement of the camera.

It should be understood that in the example of FIGS. 2(a)-(f), no reconstruction of pixels in any of the transformed frames has occurred. This example assumes that reconstruction according to the principles of the present disclosure is only initiated at the time of transformation of frame 48 of FIG. 2(f).

Figure 2:
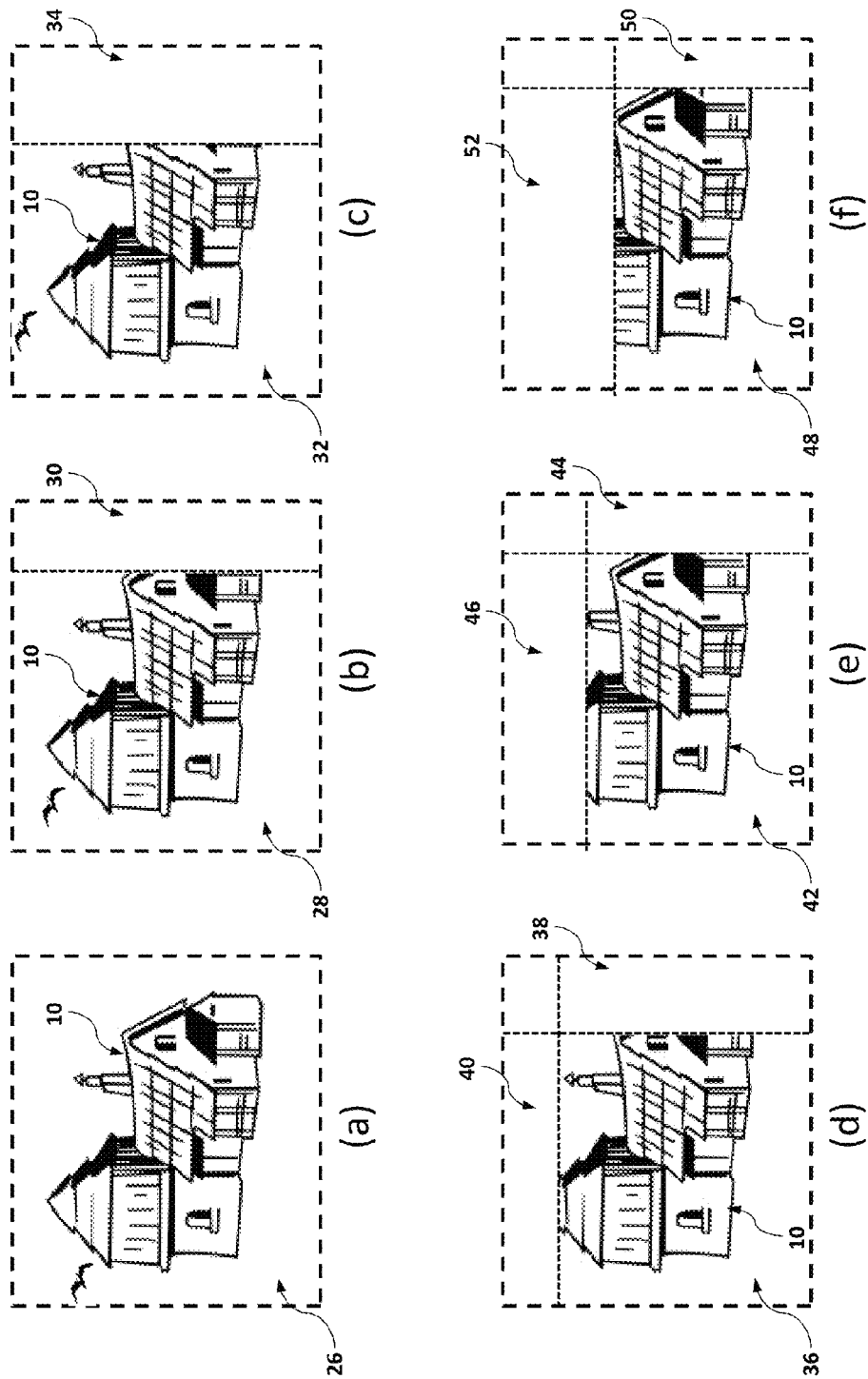
FIGS. 2(a)-(f) depict a series of image frames that have been transformed as a result of motion compensation techniques.
Figure 3:
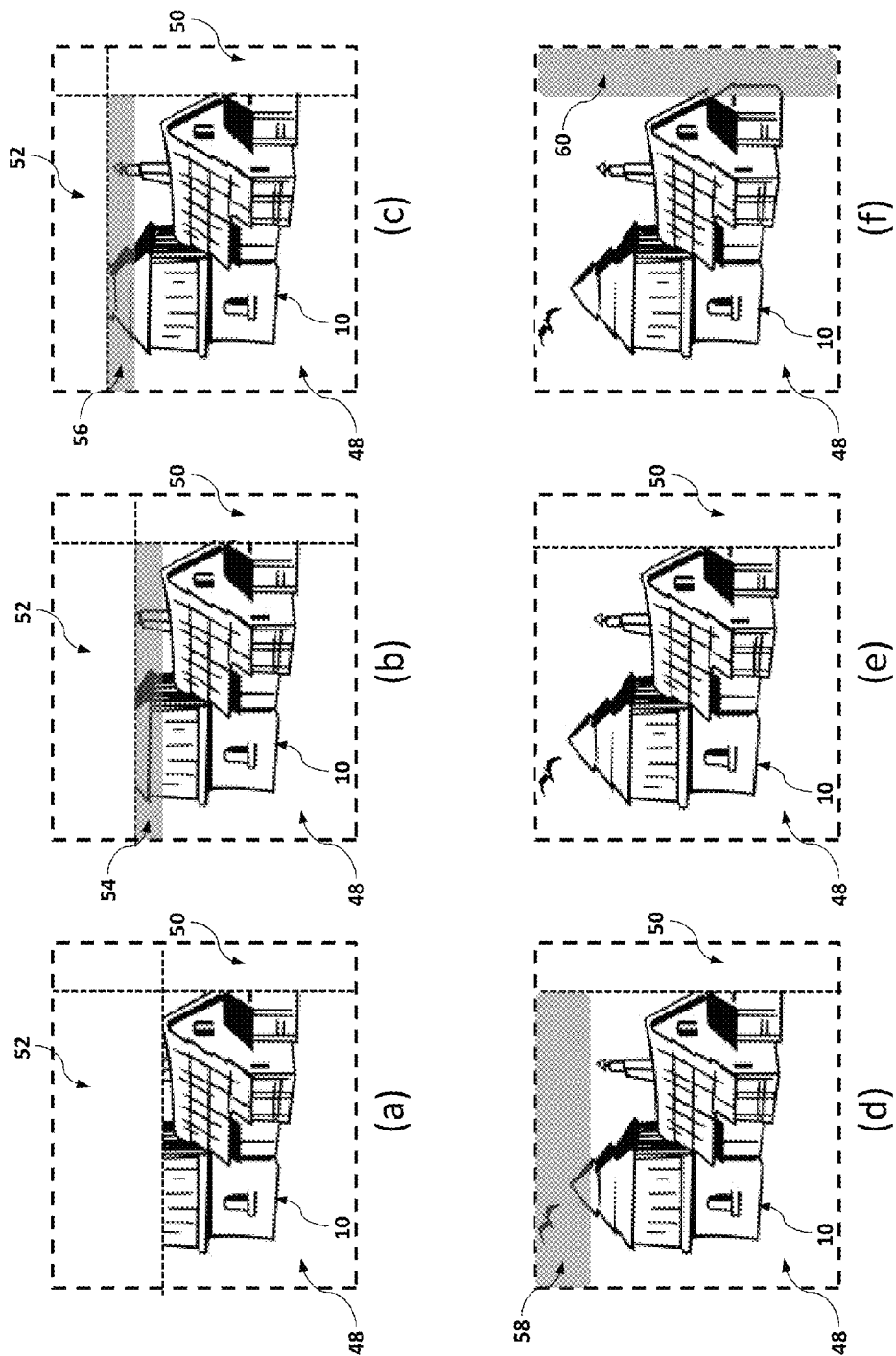
FIGS. 3(a)-(f) depict a plurality of reconstruction iterations according to one embodiment of the present disclosure of the transformed frame of FIG. 2(f)

Referring now to FIG. 3, the current transformed frame of FIG. 2(f) is replicated as frame 48 in FIG. 3(a). As an initial step in the method and apparatus of the present disclosure, missing pixels in transformed frame 48 are identified. These pixels are at coordinates within areas 50 and 52 of transformed frame 48. After identifying missing pixels in transformed frame 48, in one embodiment pixels within the immediately preceding cached transformed frame 42 are processed. In this example, cached transformed frame 42 does not include pixels with valid data corresponding to missing pixels in area 50 of current transformed frame 48. However, cached transform frame 42 does include some pixels corresponding to missing pixels in area 52 of current transformed frame 48. The values of these pixels from cached transformed frame 42 are inserted into current transformed frame 48, and are depicted as pixels residing within reconstructed area 54 of FIG. 3(b). Having inserted pixels within reconstructed area 54 of current transformed frame 48, the process of the present disclosure stops attempting to identify pixels in cached transformed frames corresponding to missing pixels in current transformed frame 48 that reside within area 54.

Next, missing pixels identified as residing in areas 50 and 52 of current transformed frame 48 (excluding those pixels already inserted into area 54) are compared to pixels in cached transformed frame 36 of FIG. 2(*d*). In this example, cached transformed frame 36 does not include pixels with valid data corresponding to missing pixels in area 50 of current transformed frame 48. However, cached transform frame 36 does include some pixels corresponding to missing pixels in area 52 (not already replaced by pixels from cached transformed frame 42 of FIG. 2(*e*)) of current transformed frame 48. The values of these pixels from cached transformed frame 36 are inserted into current transformed frame 48, and are depicted as pixels residing within reconstructed area 56 of FIG. 3(*c*). Having inserted pixels within reconstructed area 56 of current transformed frame 48, the process of the present disclosure stops attempting to identify pixels in cached transformed frames corresponding to missing pixels in current transformed frame 48 that reside within area 56.

Next, missing pixels identified as residing in areas 50 and 52 of current transformed frame 48 (excluding those pixels already inserted into areas 54 and 56) are compared to pixels in cached transformed frame 32 of FIG. 2(*c*). In this example, cached transformed frame 32 also does not include pixels with valid data corresponding to missing pixels in area 50 of current transformed frame 48. However, cached transform frame 32 does include some pixels corresponding to missing pixels in area 52 (not already replaced by pixels from cached transformed frame 42 of FIG. 2(*e*) or cached transformed frame 36 of FIG. 2(*d*)) of current transformed frame 48. The values of these pixels from cached transformed frame 32 are inserted into current transformed frame 48, and are depicted as pixels residing within reconstructed area 58 of FIG. 3(*d*). It should be noted that the pixels representing the bird in its position of cached transformed frame 32 of FIG. 2(*c*) are inserted into corresponding positions of current transformed frame 48 as shown in reconstructed area 58 of current transformed frame 48 of FIG. 3(*d*). Having inserted pixels within reconstructed area 58 of current transformed frame 48 (including the bird), the process of the present disclosure stops attempting to identify pixels in cached transformed frames corresponding to missing pixels in current transformed frame 48 that reside within area 58.

Next, missing pixels identified as residing in areas 50 and 52 of current transformed frame 48 (excluding those pixels already inserted into areas 54, 56 and 58) are compared to pixels in cached transformed frame 28 of FIG. 2(*b*). In this example, cached transformed frame 28 does not include pixels with valid data corresponding to missing pixels in area 50 of current transformed frame 48. Additionally, cached transform frame 28 is not processed to identify pixels corresponding to missing pixels in area 52 of current transformed frame 48 as all of the missing pixels have been reconstructed using pixels from cached transformed frame 42 of FIG. 2(*e*), cached transformed frame 36 of FIG. 2(*d*) and cached transformed frame 32 of FIG. 2(*c*). As such, no values of pixels from cached transformed frame 28 are inserted into current transformed frame 48 and current transformed frame 48 of FIG. 3(*e*) is identical to current transformed frame 48 of FIG. 3(*d*). It should be noted that the pixels representing the bird in its position of cached transformed frame 32 of FIG. 2(*c*) are retained in the same corresponding positions of current transformed frame 48 as shown in area 58 of current transformed frame 48 of FIG. 3(*d*). Having processed pixels within cached transformed frame 28 of FIG. 2(*b*), the process of the present disclosure continues in reverse chronological order to process pixels within cached transformed frame 26 of FIG. 2(*a*).

When processing pixels within cached transformed frame 26 of FIG. 2(*a*), missing pixels identified as residing in areas 50 and 52 of current transformed frame 48 (excluding those pixels already inserted into areas 54, 56 and 58) are compared to pixels in cached transformed frame 26 of FIG. 2(*a*). In this example, cached transformed frame 26 includes pixels with valid data corresponding to missing pixels in area 50 of current transformed frame 48. Cached transform frame 26 does not include pixels for insertion into area 52 as all of those missing pixels have already been replaced. The values of the pixels corresponding to missing pixels in area 50 of current transformed frame 48 from cached transformed frame 26 are inserted into current transformed frame 48, and are depicted as pixels residing within reconstructed area 60 of FIG. 3(*f*). Again, it should be noted that the pixels representing the bird in its position of cached transformed frame 32 of FIG. 2(*c*) are retained in the same corresponding positions of current transformed frame 48 as shown in area 58 of current transformed frame 48 of FIG. 3(*d*).

Having inserted pixels within reconstructed area 60 to complete the reconstruction of all missing pixels in current transformed frame 48, the process of the present disclosure stops attempting to identify missing pixels in current transformed frame 48. It should be understood, however, that if additional missing pixels existed in current transformed frame 48, and if additional cached transformed frames were available for processing, the process of the present disclosure would continue processing cached transformed frames. In one embodiment of the present disclosure, a relatively small number of transformed frames are cached (e.g., six transformed frames). In other embodiments of the present disclosure, more or fewer transformed frames may be cached.

As should be apparent from the foregoing, the reconstruction of stationary structure 10 in reconstructed frame 48 of FIG. 3(*f*) is accurate in all respects when compared to the earlier captured image of structure 10 in transformed frame 26 of FIG. 2(*a*). However, reconstructed frame 48 of FIG. 3(*f*) depicts the bird at its most recent location (from cached transformed frame 32 of FIG. 2(*c*)), while in reality the bird would likely have flown out of the viewing area of the camera when current frame 48 was captured. This is an example of a time delay of images that may occur using the sequential reverse chronological processing of cached transformed frames according to the teachings of the present disclosure. However, as will be understood by those skilled in the art, the rapid frame capture rates of typical modern cameras (i.e., 24 or more frames per second) typically result in only small variations in the images depicted in the relatively small number of cached transformed frames, and the above-mentioned time delay will result in essentially negligible time-shifted content.

Figure 4:
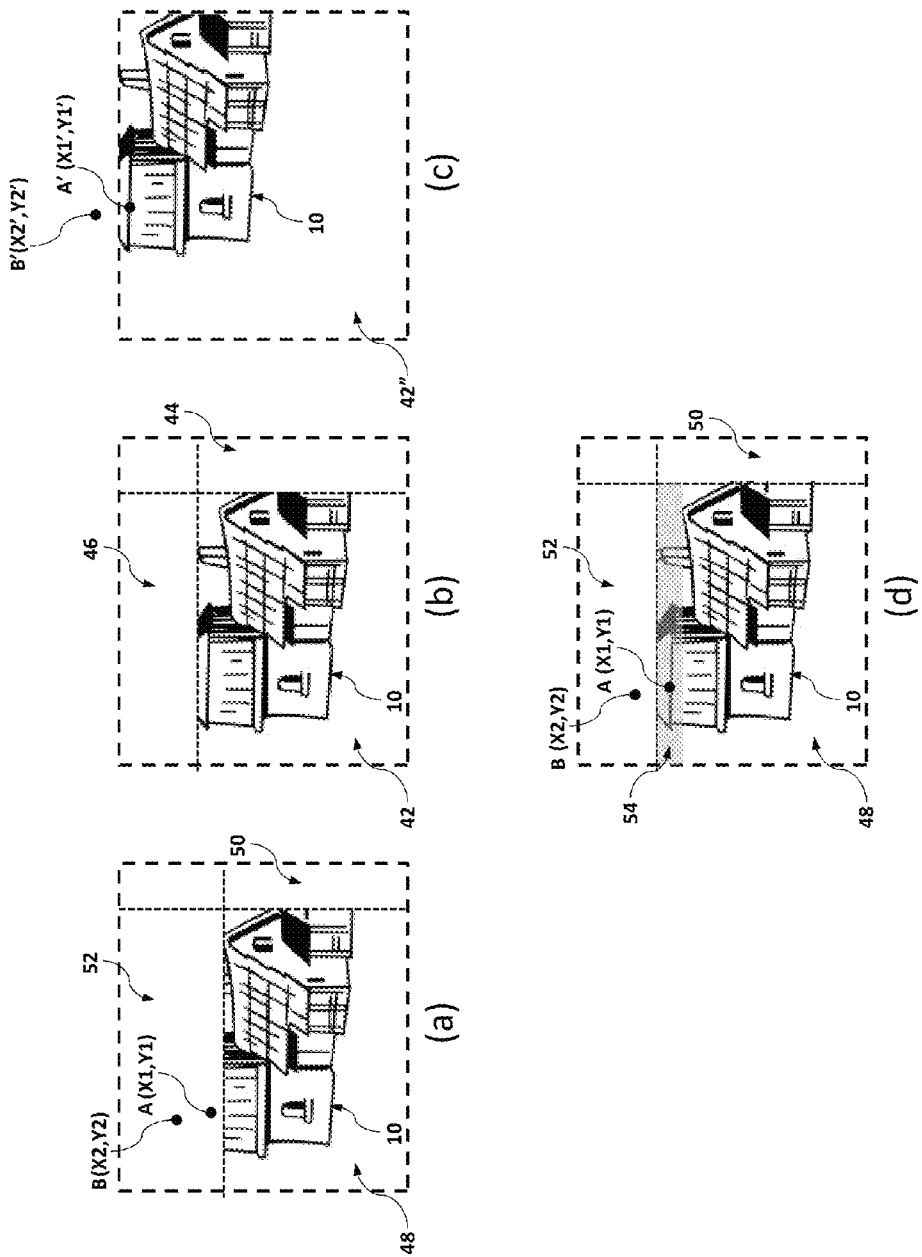
FIGS. 4(a)-(d) depict frames corresponding to a series of steps in a process of pixel reconstruction according to one embodiment of the present disclosure.

FIGS. 4(*a*)-(*d*) provide a visual depiction of one method according to the present disclosure for reconstructing missing pixels in a current transformed frame. In this embodiment, a cached transformed frame is converted using an affine transformation according to known principles such that the original coordinates of pixels in the cached transformed frame may be compared to missing pixels in the current transformed frame. More specifically, in this example current transformed frame 48 of FIG. 4(*a*) is processed to identify coordinates of missing pixels after transformation of the originally captured frame to compensate for undesired motion. Current transformed frame 48 includes missing pixels in area 50 and area 52. For purposes of a simplified explanation, assume that only two missing pixels in area 52 (i.e., missing pixel A at coordinates X1,Y1 and missing pixel B at coordinates X2,Y2) are being evaluated for reconstruction. The coordinates of missing pixels A and B are determined relative to a reference coordinate associated with the valid image (here, structure 10). In particular, the coordinates of the missing pixels are considered valid if W>X>0 and H>Y>0, where W is the width of the image and H is the height of the image. It should be understood, of course, that the present invention contemplates evaluating all missing pixels in areas 50 and 52 when processing cached transformed frames.

The transformed frame immediately preceding current transformed frame 48 in cache is cached transformed frame 42. As shown in FIG. 4(b), cached transformed frame 42 has also been motion compensated, thereby resulting in missing pixels in areas 44 and 46. In this embodiment, the transform matrix in cache used to motion compensate cached transformed frame 42 is retrieved, and used in an affine transformation as is known to those skilled in the art to convert cached transformed frame 42 back to the originally captured, non-motion compensated image depicted as frame 42" of FIG. 4(c). Next, the coordinates of missing pixels A and B are mapped onto frame 42" to identify corresponding pixel coordinates to be used in reconstruction of current transformed frame 48. In one embodiment, the cached transform matrix ("T") is of the form:

$$T = \begin{pmatrix} s*\cos(\alpha), & s*\sin(\alpha), & c \\ -s*\sin(\alpha), & s*\cos(\alpha), & d \\ 0, & 0, & 1 \end{pmatrix}$$

where s is a zoom factor, a is a rotation angle, c is displacement of the X coordinate, and d is displacement of the Y coordinate. In the case of this example, where rotation and zoom are zero, the cached transform matrix can be simplified to the following form:

$$T = \begin{pmatrix} 1 & 0 & c \\ 0 & 1 & d \\ 0 & 0 & 1 \end{pmatrix}$$

The missing pixel A at coordinates X1,Y1 and the missing pixel B at coordinates X2,Y2 are mapped to corresponding original pixel coordinates A' and B' in cached transformed frame 42 according to the following equations:

$$A = \begin{pmatrix} X1 \\ Y1 \\ 1 \end{pmatrix};$$

$$A' = T*A;$$

thus, $A' = \begin{pmatrix} X1' \\ Y1' \\ 1 \end{pmatrix};$ and $$B = \begin{pmatrix} X2 \\ Y2 \\ 1 \end{pmatrix};$$

-continued $$B' = T*B;$$

thus, $B' = \begin{pmatrix} X2' \\ Y2' \\ 1 \end{pmatrix}.$

Thus, in this example missing pixel A maps to pixel A' at original coordinates X1',Y1' of frame 42" and missing pixel B maps to pixel B' at original coordinates X2',Y2' of frame 42". Pixel A' at original coordinates X1',Y1' is within the boundaries of the original camera viewing area (depicted as dashed lines in FIG. 4(c)), and is therefore considered valid. Pixel B' at original coordinates X2',Y2', on the other hand, is out of range, and considered invalid. Accordingly, as depicted in FIG. 4(d), the value of pixel A' at original coordinates X1',Y1' is inserted at coordinates X1,Y1 of missing pixel A in current transformed frame 48, but no value is inserted for missing pixel B. As should be apparent from the foregoing, during processing of cached frame 42, the coordinates of all missing pixels in current transformed frame 48 are compared to original pixel coordinates in frame 42" to identify pixels corresponding to missing pixel coordinates and having valid data for insertion into current transformed frame 48. FIG. 4(d) shows that all pixels in area 54 of partially reconstructed current transformed frame 48 have been inserted as a result of processing cached transformed frame 42.

In another embodiment of the present disclosure depicted in FIGS. 5(a)-(c), pixels in a cached transformed frame are compared directly to missing pixel coordinates of a current transformed frame without converting pixels in the cached transformed frame into their original coordinates. More specifically, current transformed frame 48 of FIG. 5(a) is identical to current transformed frame 48 of FIG. 4(a), and the same missing pixels A and B are the subject of this example. After the coordinates of missing pixels A and B are identified, the transformed frame immediately preceding current transformed frame 48 (i.e., cached transformed frame 42) is processed.

In this example, like the example of FIG. 4, cached transformed frame 42 has been motion compensated, thereby resulting in missing pixels in areas 44 and 46. In this embodiment, however, no transform matrix is used to convert cached transformed frame 42 back to the originally captured, non-motion compensated image such as that depicted as frame 42" of FIG. 4(c). Instead, when cached transformed frame 42 was motion compensated, each pixel in areas 44 and 46 is flagged as an invalid pixel. These invalid pixels may be identified as such in a variety of ways such as by inserting a special value known to be invalid at the missing pixel coordinates or associating an invalid flag with each missing pixel coordinate. Next, the coordinates of missing pixels A and B are compared to corresponding pixel coordinates in cached transformed frame 42. In this example, the pixel at coordinates X1",Y1" is identified as corresponding to the coordinates of missing pixel A and having valid data, and the value of the pixel at coordinates X1",Y1" is inserted at coordinates X1,Y1 of current transformed frame 48 as shown in FIG. 5(c). The pixel at coordinates X2",Y2" of cached transformed frame 42, on the other hand, while corresponding to the coordinates of missing pixel B, is flagged as an invalid pixel, and missing pixel B of current transformed frame 48 remains identified as a missing pixel.

Figure 5:
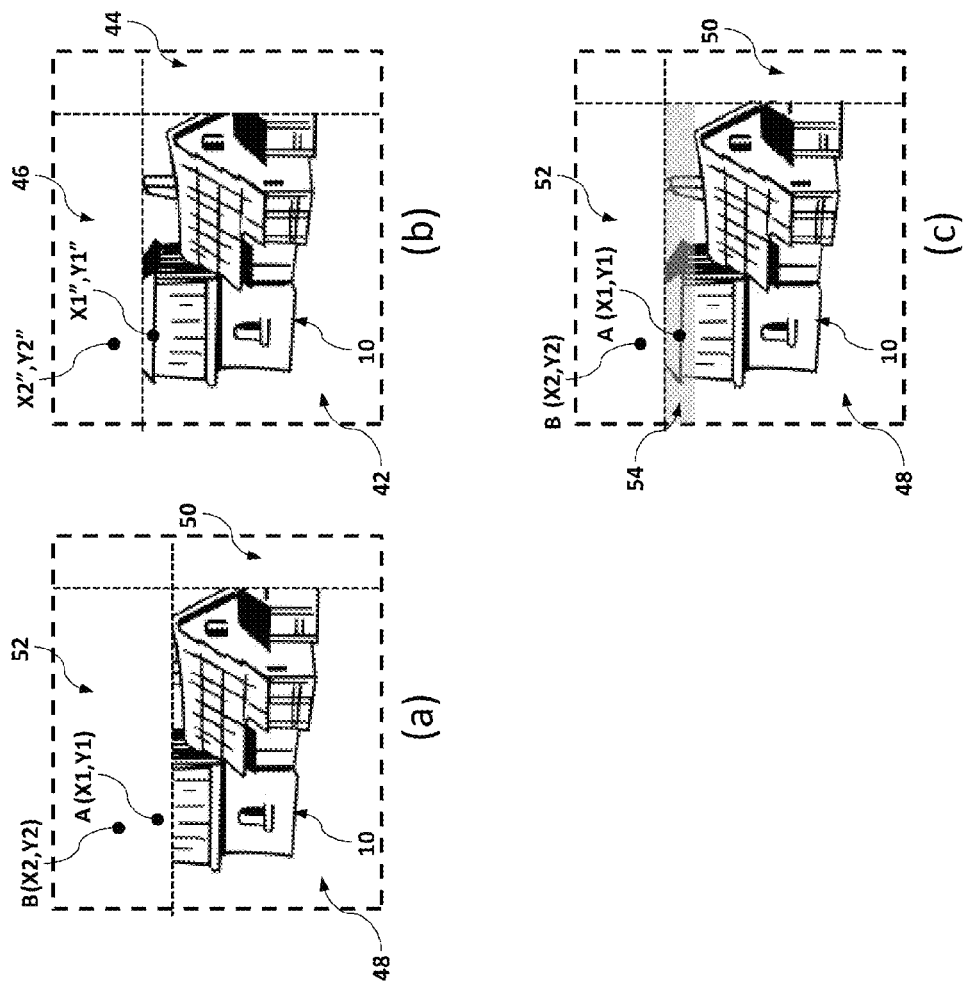
FIGS. 5(a)-(c) depict frames corresponding to a series of steps in a process of pixel reconstruction according to another embodiment of the present disclosure.

It should be understood, of course, that in both examples of FIGS. 4 and 5, the process of the present disclosure is employed to evaluate additional cached transformed frames in reverse chronological order (or any other order, or, in other embodiments, in parallel) to identify pixels with valid data corresponding to missing pixel coordinates of current transformed frame 48, and insert the corresponding pixel values at missing pixel coordinates in current transformed frame 48. Such evaluation of cached transformed frames is repeated using other cached transformed frames, but only for missing pixels in current transformed frame 48, until all missing pixels in current transformed frame 48 are reconstructed or no more cached transformed frames are available for processing, whichever occurs first. As explained below, any remaining missing pixels in current transformed frame 48 may be reconstructed using conventional pixel mirroring techniques.

Figure 6:
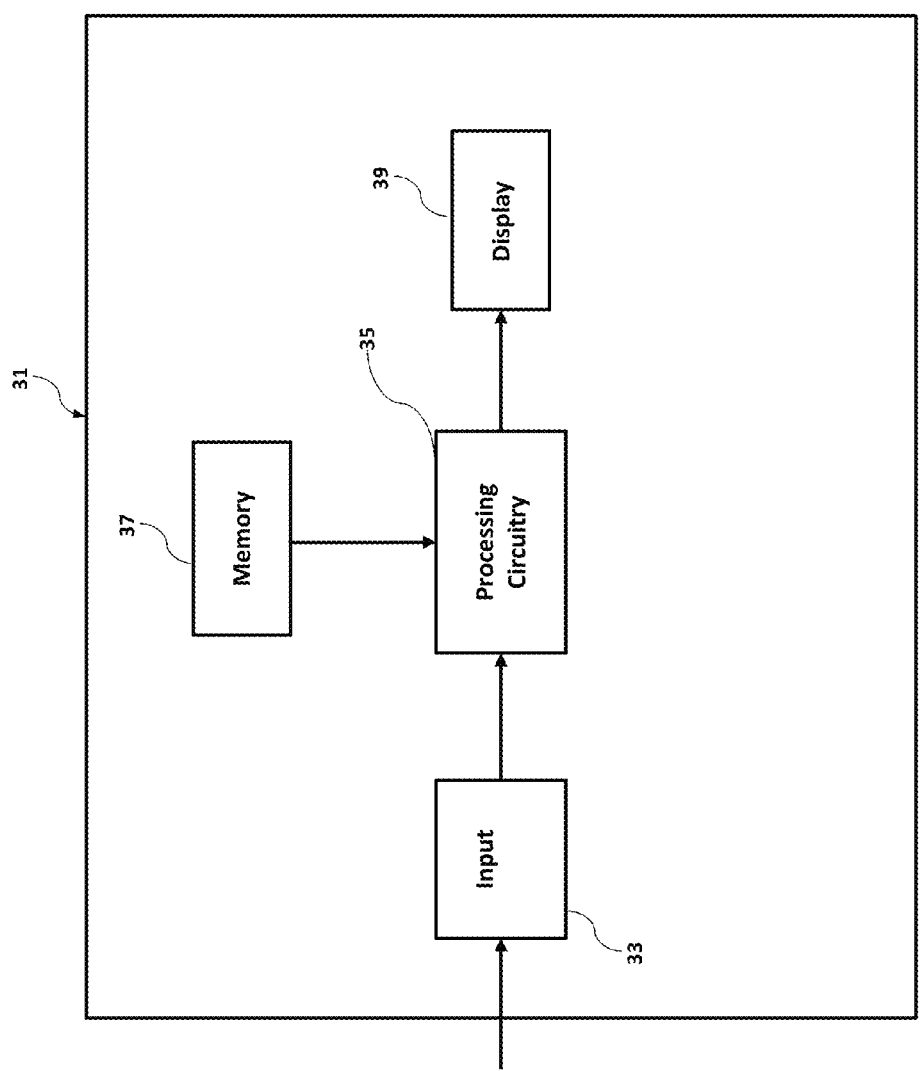
FIG. 6 is a block diagram of a device according to the teachings of the present disclosure.

Referring now to FIG. 6, a simplified block diagram is shown of a device 31 for reconstructing video frames. Device 31, described in further detail below with reference to FIGS. 7 and 8, generally includes an input 33 for receiving video frames, processing circuitry 35, a memory 37 and a display 39. Memory 37 generally includes computer-readable instructions for execution by processing circuitry 35, as well as storage space for, among other things, cached transformed frames of video. As will be understood by those skilled in the art, memory 37 may include one or more memory devices of a variety of suitable technologies. Processing circuitry 35 generally includes one or more processors or other suitable hardware that, among other things, transforms incoming video frames to compensate for undesired motion, identifies coordinates of missing pixels in a current transformed frame, and sequentially processes, for only the missing pixel coordinates, transformed frames cached in memory 37 in reverse chronological order to identify pixels at coordinates in the cached transformed frames having valid data and corresponding to one of the missing pixel coordinates. Upon identifying a pixel having valid data at a coordinate in a cached transformed frame corresponding to a missing pixel coordinate, processing circuitry 35 then inserts the valid data at the missing pixel coordinate. When frame reconstruction is completed in the manner described in detail below, the reconstructed frames of video are provided to display 39 for output.

Figure 7:
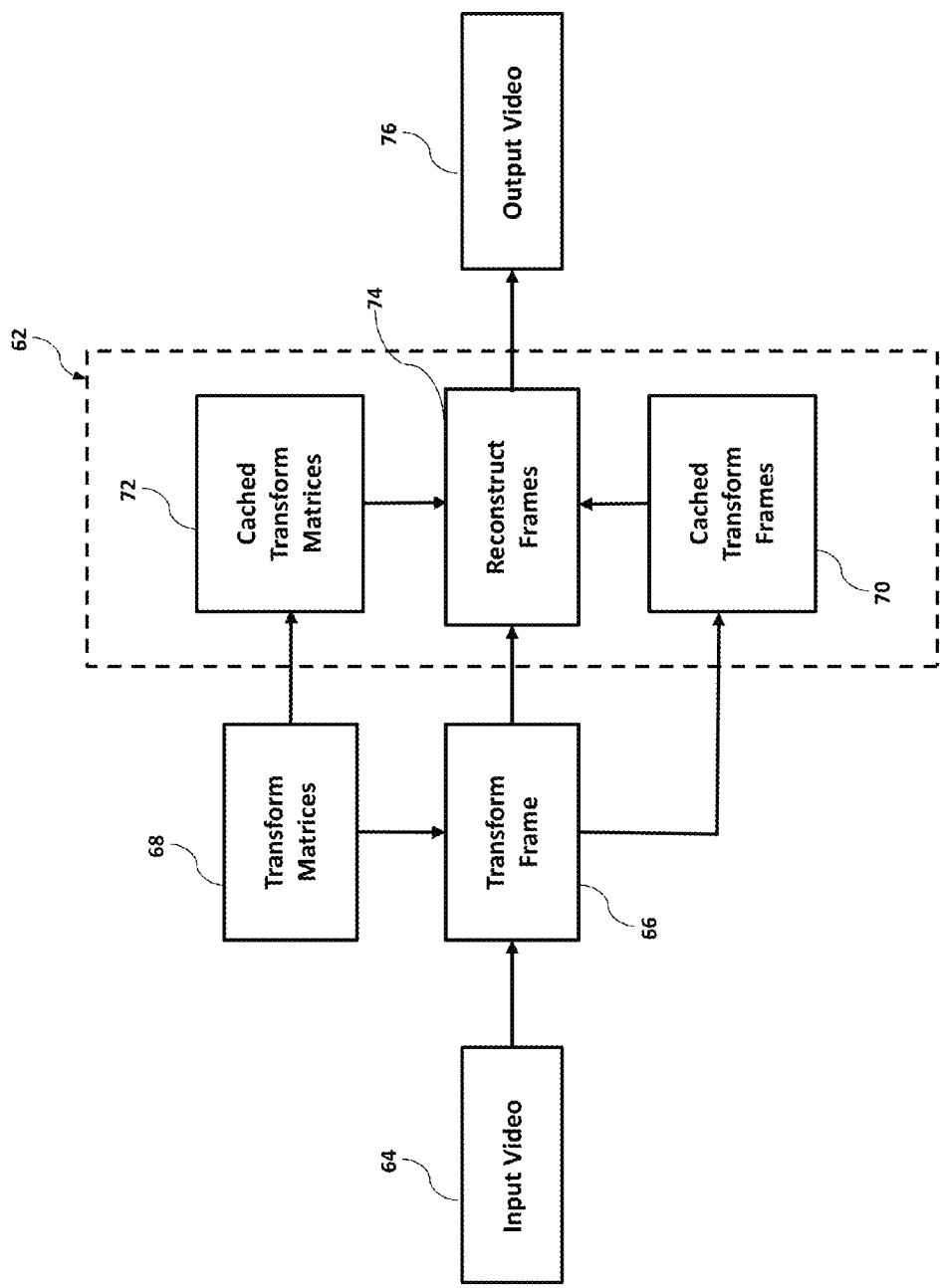
FIG. 7 is a functional block diagram of a device for performing the process corresponding to FIGS. 4(a)-(d)

Referring now to FIG. 7, a functional block diagram is shown depicting a device for performing the process described above with reference to FIGS. 4(*a*)-(*d*). The pixel reconstruction functions associated with the present disclosure are depicted within block 62. The remaining functional blocks are common to various video processing devices and methods known in the art. At input video block 64, incoming video frames are captured in their original, non-motion compensated form. At processor block 66, one or more processors transform the original frames using transform matrices represented by block 68 to compensate for undesired camera motion. Each transformed frame is cached in memory block 70, and the corresponding transform matrix used to generate each transformed frame is cached in memory block 72. The combination of processor block 74 and processor block 66 represents processing circuitry for performing the functions of transforming original frames as described above and executing the missing pixel reconstruction process described above with reference to FIGS. 4(*a*)-(*d*) including identifying missing pixels in a current transformed frame and sequentially processing cached transformed frames (using corresponding cached transformed matrices in affine transformations) in reverse chronological order to identify original coordinates in cached transformed frames, determine whether the data at the original coordinates is valid, and insert any valid data from the original coordinates into corresponding missing pixel coordinates of the current transformed frame. Processing circuitry may include one or more processors that execute instructions, or discrete logic, state machines, DSP or any suitable combination of hardware and executing code. Finally, the reconstructed frames of video are sequentially provided for output at output video block 76.

Figure 8:
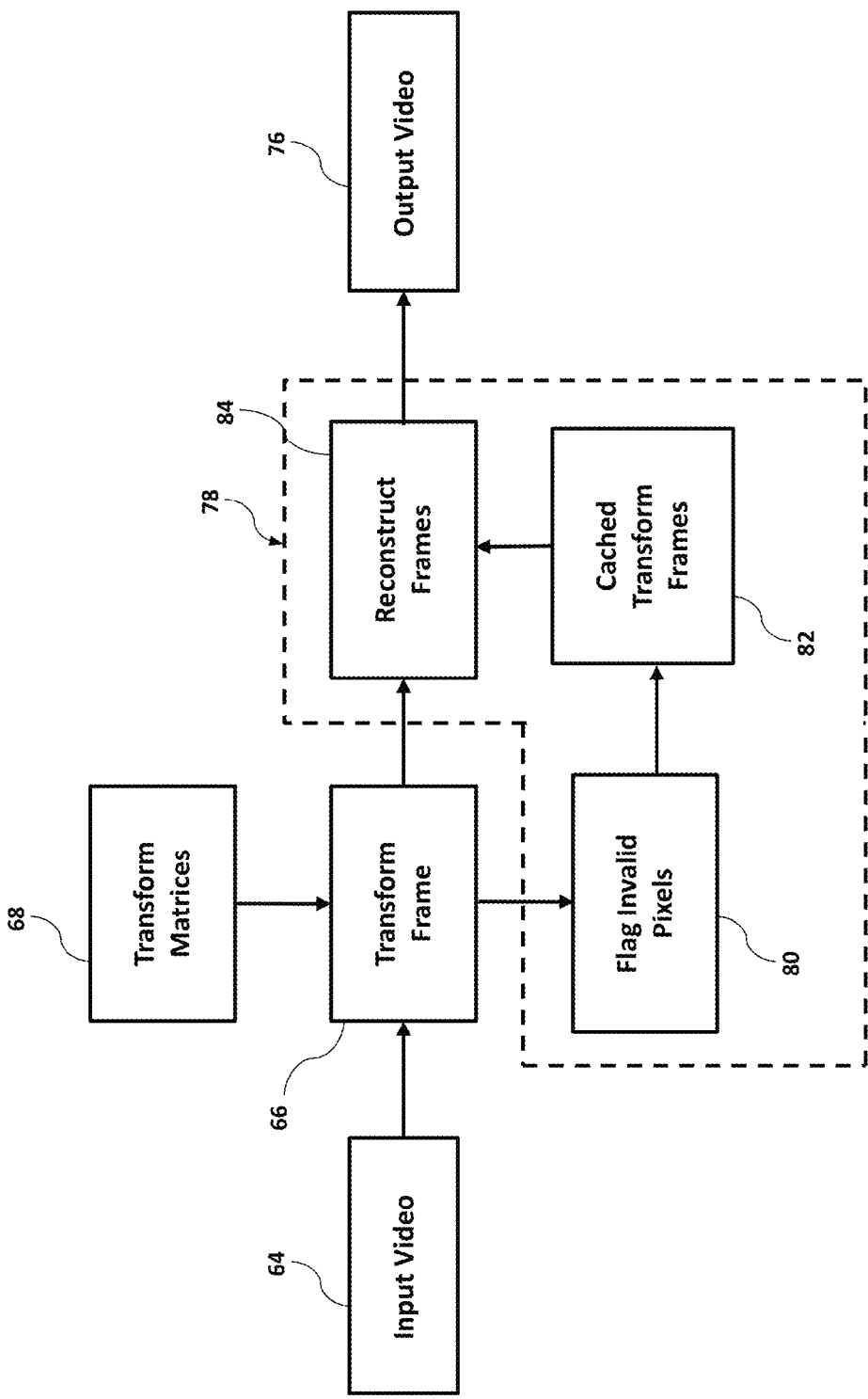
FIG. 8 is a function block diagram of a device for performing the process corresponding to FIGS. 5(a)-(c)

FIG. 8 provides a functional block diagram of a device for performing the process of the alternative embodiment described above with reference to FIGS. 5(*a*)-(*c*). The pixel reconstruction functions associated with this embodiment of the present disclosure are depicted within block 78. As with the diagram of FIG. 7, the remaining functional blocks in FIG. 8 are common to various video processing devices and methods known in the art. At input video block 64, incoming video frames are captured in their original, non-motion compensated form. At processor block 66, one or more processors transform the original frames using transform matrices represented by block 68 to compensate for undesired camera motion. At block 80, the one or more processors identify each missing pixel in each transformed frame such as by flagging the missing pixels in the manner described above. Then, each transformed frame (with missing pixels flagged) is cached in memory block 82. Block 84 also includes one or more processors and combined with block 66 represents processing circuitry to perform the functions described above with reference to block 66 and to perform the missing pixel reconstruction process described above with reference to FIGS. 5(*a*)-(*c*) including identifying missing pixels in a current transformed frame and sequentially processing cached transformed frames in reverse chronological order to identify pixel coordinates in cached transformed frames not flagged as having invalid data and corresponding to missing pixel coordinates in the current transformed frame, and insert any valid data from the pixel coordinates of the cached transformed frames into corresponding missing pixel coordinates of the current transformed frame. Finally, the reconstructed frames of video are sequentially provided for output at output video block 76.

Figure 9:
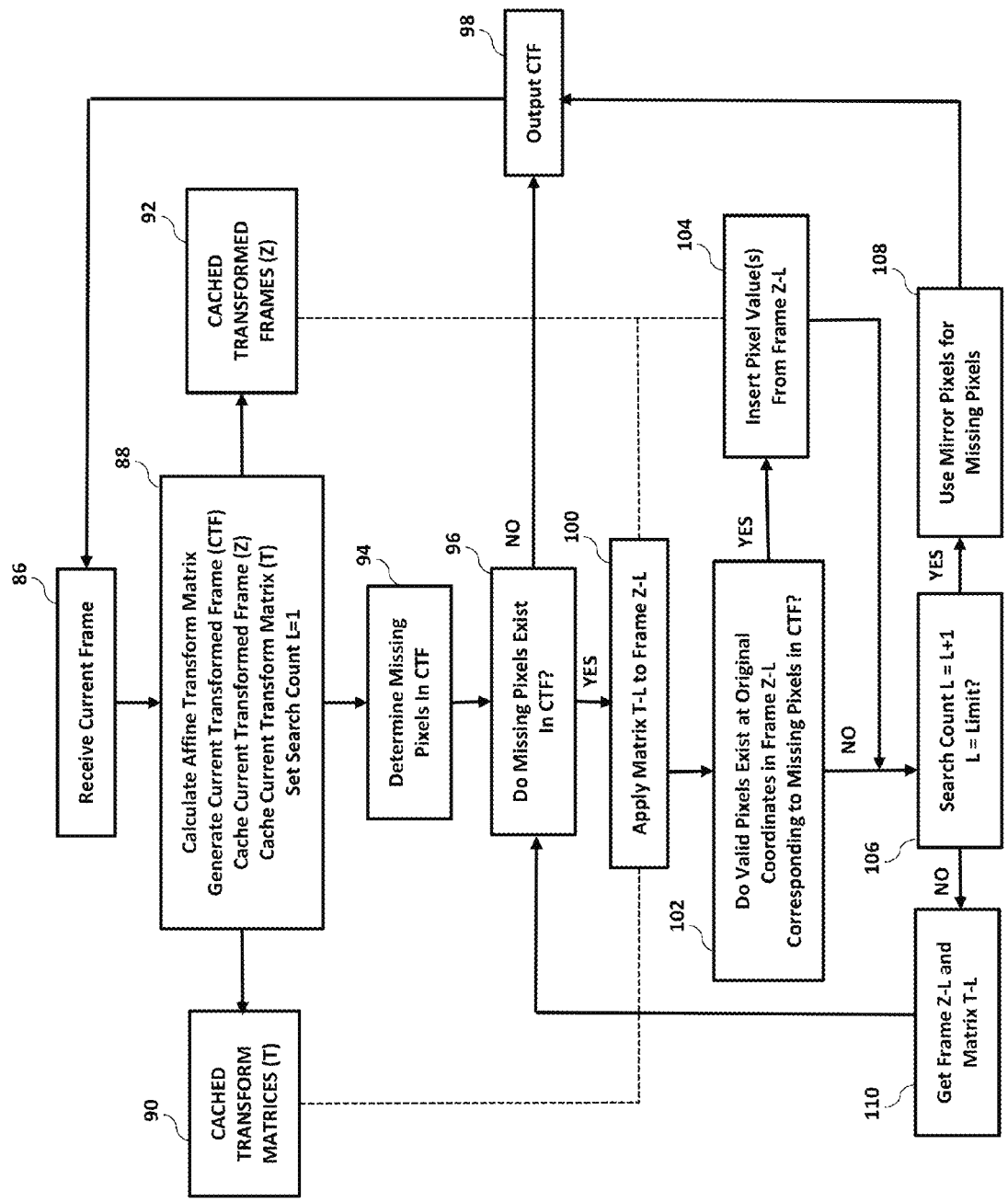
FIG. 9 is a flowchart illustrating steps performed by the device of FIG. 7.

Referring now to FIG. 9, a flow chart is depicted of the steps performed by the device of FIG. 7 to carry out the process described above with reference to FIGS. 4(*a*)-(*d*). In FIG. 9, a current frame is received at block 86. At block 88, an affine transform matrix for motion is calculated according to principles that are known in the art. Also, a transform matrix is applied to the current frame to generate a current transformed frame ("CTF"). The transform matrix ("T") is cached as indicated by block 90, and the resulting current transformed frame ("Z") is also cached as indicated by block 92. Finally, the search count for processing cached transform frames in the missing pixel reconstruction process described above is set to 1.

At block 94, the current transformed frame is evaluated for missing pixels. At block 96, it is determined whether missing pixels exist in the current transformed frame. If missing pixels do not exist, then the current transformed frame is provided for output as indicated by block 98, and another current frame is received at block 86. If missing pixels exist in the current transformed frame, then at block 100 cached transform matrix T−1 (i.e., the most recently cached transform matrix preceding the transform matrix used for the current transformed frame) is retrieved and used in an affine transformation to convert pixels in retrieved cached transformed frame Z−1 (i.e., the most recently cached transformed frame preceding the current transformed frame) to their original coordinates.

At block 102, it is determined, only for those missing pixels identified in the current transformed frame, whether pixels having valid data exist at original coordinates in cached transformed frame Z−1 corresponding to coordinates of missing pixels in the current transformed frame. If such valid pixels exist, then at block 104 the values of the pixels are retrieved from cached transformed frame Z−1 and inserted at the corresponding missing pixel coordinates of the current transformed frame. If such pixels do not exist (or after they are inserted at block 104), then at block 106 the search count for the current transformed frame is incremented to L+1. Also at block 106, it is determined whether the search count has reached a predefined limit, which limit may correspond to the number of cached transformed frames available for processing. In the examples described above, a relatively small number of transformed frames are cached such as six. If the search count has reached the limit, then at block 108 a conventional pixel mirroring routine is used to reconstruct any missing pixels that have not already been reconstructed using pixels from cached transformed frames.

If the search count has not reached the limit, then at block 110 cached transformed frame Z−2 and corresponding cached transform matrix T−2 are retrieved for processing and the process returns to block 96. As it is possible that all missing pixels in the current transformed frame have been reconstructed as a result of blocks 100, 102 and 104, at block 96 it is again determined whether the current transformed frame includes missing pixels. If not, then the current transformed frame is output at block 98 and another current frame is received at block 86. However, if missing pixels still exist in the current transformed frame, then the steps at blocks 100, 102 and (possibly) 104 are repeated, and the search count is again incremented by 1 and compared to the limit at block 106. In this manner, all of the cached transformed frames are processed in reverse chronological order unless all of the missing pixels in the current transformed frame are reconstructed before reaching the search count limit. Finally, if the search count limit is reached, then any remaining missing pixels in the current transformed frame are reconstructed using conventional pixel mirroring techniques.

Figure 10:
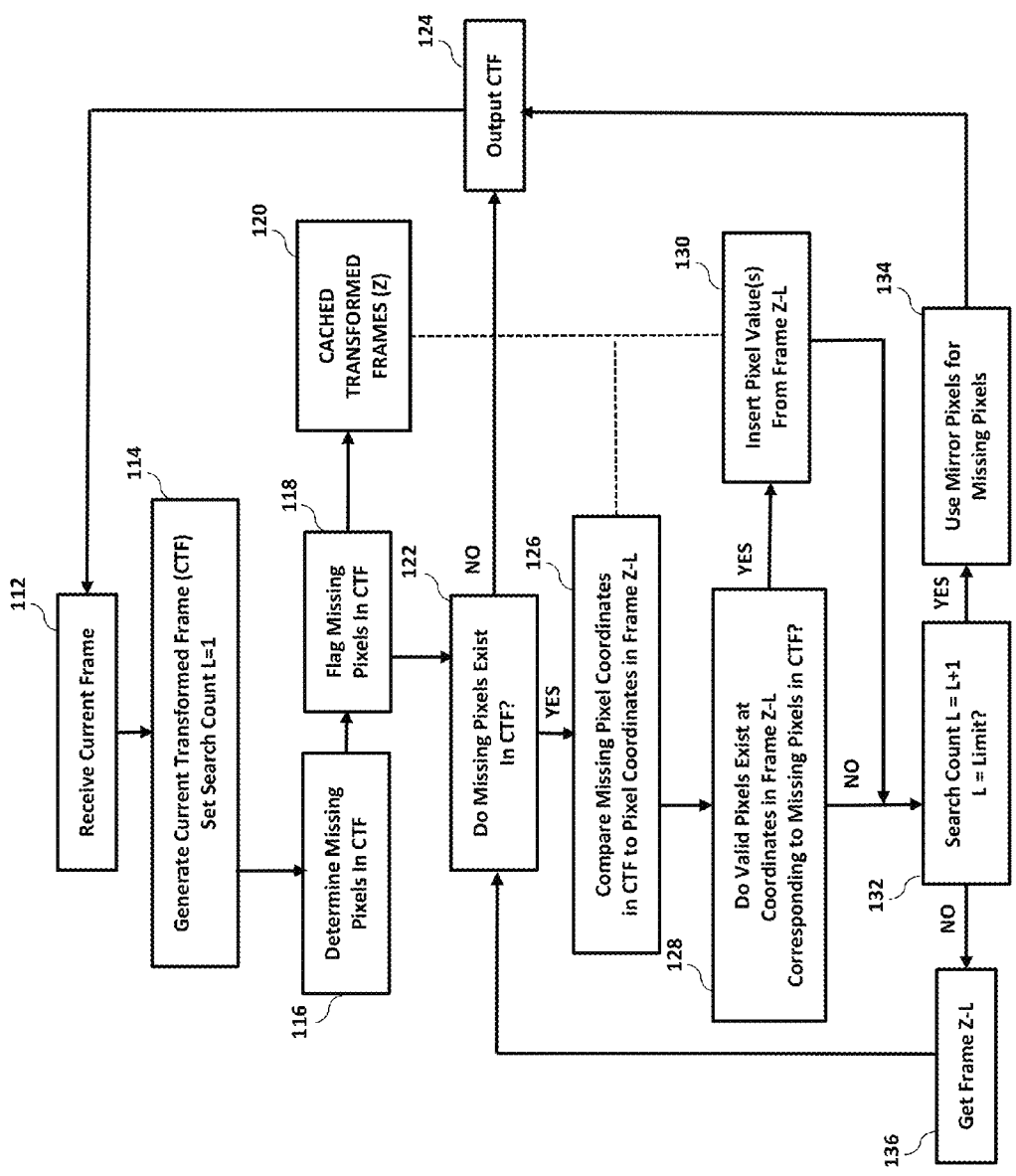
FIG. 10 is a flowchart illustrating steps performed by the device of FIG. 8.

Referring now to FIG. 10, a flow chart is depicted of the steps performed by the device of FIG. 8 to carry out the process described above with reference to FIGS. 5(a)-(c). In FIG. 10, a current frame is received at block 112. At block 114, a transform matrix is applied to the current frame to generate a current transformed frame ("CTF"). Also, the search count for processing cached transform frames in the missing pixel reconstruction process described above is set to 1.

At block 116, the current transformed frame is evaluated for missing pixels. At block 118 any missing pixels in the current transformed frame are flagged as having invalid data or being out-of-range in the manner described above, and the resulting transformed frame is cached as indicated by block 120. At block 122, it is determined whether missing pixels exist in the current transformed frame. If missing pixels do not exist, then the current transformed frame is provided for output as indicated by block 124, and another current frame is received at block 112. If missing pixels exist in the current transformed frame, then at block 126 the coordinates of the missing pixels are compared to pixel coordinates in cached transformed frame Z−1 (i.e., the most recently cached transformed frame preceding the current transformed frame), and at block 128 it is determined, only for those missing pixels identified in the current transformed frame, whether pixels having valid data exist in cached transformed frame Z−1 corresponding to coordinates of missing pixels in the current transformed frame. If such valid pixels exist, then at block 130 the values of the pixels are retrieved from cached transformed frame Z−1 and inserted at the corresponding missing pixel coordinates of the current transformed frame. If such pixels do not exist (or after they are inserted at block 130), then at block 132 the search count for the current transformed frame is incremented to L+1. Also at block 132, it is determined whether the search count has reached a predefined limit, which limit may correspond to the number of cached transformed frames available for processing. In the examples described above, a relatively small number of transformed frames are cached such as six. If the search count has reached the limit, then at block 134 conventional pixel mirroring techniques are used to reconstruct any missing pixels that have not already been reconstructed using pixels from cached transformed frames.

If the search count has not reached the limit, then at block 136 cached transformed frame Z−2 is retrieved for processing and the process returns to block 122. As it is possible that all missing pixels in the current transformed frame have been reconstructed as a result of blocks 126, 128 and 130, at block 122 it is again determined whether the current transformed frame includes missing pixels. If not, then the current transformed frame is output at block 128 and another current frame is received at block 112. However, if missing pixels still exist in the current transformed frame, then the steps at blocks 126, 128 and (possibly) 130 are repeated, and the search count is again incremented by 1 and compared to the limit at block 132. In this manner, all of the cached transformed frames are processed in reverse chronological order unless all of the missing pixels in the current transformed frame are reconstructed before reaching the search count limit. Finally, if the search count limit is reached, then any remaining missing pixels in the current transformed frame are reconstructed using conventional pixel mirroring techniques.

Among other advantages, for example, the method and apparatus permits storage of a relatively small number of cached transformed frames, thereby saving cost on memory space. Additionally, as the method and apparatus processes cached transformed frames to reconstruct only the missing pixels in a current transformed frame, relatively small processing power is required, and real-time processing of video frames is possible using relatively inexpensive processing devices such as GPUs, APUs, video processing ASICs, set top boxes, and DTVs. Additionally, the reduced memory required and reduced amount of required processing, compared to, for example, the exhaustive search approach, results in lower power consumption. Moreover, loss of video content is minimized. Other advantages will be recognized by those of ordinary skill in the art.

Finally, it should also be understood that the concepts and principles of the present disclosure may be employed for areas of current transformed frames identified as having missing pixels, rather than for individual missing pixels of current transformed frames.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:
1. A method for reconstructing video frames that include missing pixels as a result of video stabilization techniques to compensate for one or more of camera movement and zooming, the method including:
    caching transformed frames of video;
    identifying coordinates of missing pixels in a current transformed frame; and processing, for only the missing pixel coordinates, the cached transformed frames to identify pixels at coordinates in the cached transformed frames having valid data and corresponding to one of the missing pixel coordinates, and, upon identifying a pixel having valid data at a coordinate in a cached transformed frame corresponding to a missing pixel coordinate, inserting the valid data at the missing pixel coordinate.

2. The method of claim 1, wherein processing the cached transformed frames includes sequentially processing the cached transformed frames.

3. The method of claim 2, wherein sequentially processing the cached transformed frames includes sequentially processing the cached transformed frames in reverse chronological order.

4. The method of claim 1, wherein caching includes caching corresponding transform matrices used to transform the transformed frames to compensate for one or more of camera movement and zooming.

5. The method of claim 4, wherein sequentially processing includes using, for each cached transformed frame processed, a corresponding cached transform matrix in an affine transformation to identify pixels at original coordinates in the cached transformed frames having valid data and corresponding to one of the missing pixel coordinates, and, upon identifying a pixel having valid data at an original coordinate in a cached transformed frame corresponding to a missing pixel coordinate, inserting the valid data at the missing pixel coordinate.

6. The method of claim 4, further including identifying missing pixel coordinates in the cached transformed frames and flagging the missing pixels to identify the missing pixels as not including valid data.

7. The method of claim 6, wherein flagging occurs before caching the transformed frames.

8. The method of claim 1, further including maintaining a count of cached transformed frames processed for the current transformed frame, and discontinuing sequentially processing when the count reaches a predefined limit.

9. The method of claim 8, further including mirroring pixels from the current transformed frame to reconstruct any missing pixels at missing pixel coordinates remaining after the count limit is reached.

10. A non-transitory computer-readable storage medium storing instructions that, when executed by one or more processors in a device for reconstructing video frames, cause the one or more processors to:
cache transformed frames of video;
identify coordinates of missing pixels in a current transformed frame; and
process, for only the missing pixel coordinates, the cached transformed frames to identify pixels at coordinates in the cached transformed frames having valid data and corresponding to one of the missing pixel coordinates, and, upon identifying a pixel having valid data at a coordinate in a cached transformed frame corresponding to a missing pixel coordinate, insert the valid data at the missing pixel coordinate.

11. The computer-readable storage medium of claim 10, wherein the instructions further cause the one or more processors to sequentially process the cached transformed frames.

12. The computer-readable storage medium of claim 10, wherein the instructions further cause the one or more processors to sequentially process the cached transformed frames in reverse chronological order.

13. The computer-readable storage medium of claim 10, wherein the instructions further cause the one or more processors to cache corresponding transform matrices used to transform the transformed frames to compensate for one or more of camera movement and zooming.

14. The computer-readable storage medium of claim 13, wherein the instructions further cause the one or more processors to use, for each cached transformed frame processed, a corresponding cached transform matrix in an affine transformation to identify pixels at original coordinates in the cached transformed frames having valid data and corresponding to one of the missing pixel coordinates, and, upon identifying a pixel having valid data at an original coordinate in a cached transformed frame corresponding to a missing pixel coordinate, insert the valid data at the missing pixel coordinate.

15. The computer-readable storage medium of claim 13, wherein the instructions further cause the one or more processors to identify missing pixel coordinates in the cached transformed frames and flag the missing pixels to identify the missing pixels as not including valid data.

16. The computer-readable storage medium of claim 15, wherein the instructions further cause the one or more processors to flag the missing pixels before caching the transformed frames.

17. The computer-readable storage medium of claim 10, wherein the instructions further cause the one or more processors to maintain a count of cached transformed frames processed for the current transformed frame, and discontinue sequentially processing cached transformed frames when the count reaches a predefined limit.

18. The computer-readable storage medium of claim 17, wherein the instructions further cause the one or more processors to mirror pixels from the current transformed frame to reconstruct any missing pixels at missing pixel coordinates remaining after the count limit is reached.

19. An apparatus for performing motion compensation on video frames, including:
a video input;
a memory;
a video output; and
processing circuitry operative to receive frames of video from the video input, apply transform matrices to the received frames to produce motion stabilized transformed frames, cache the transformed frames in the memory, reconstruct missing pixels in a current transformed frame, and provide the reconstructed current transformed frame to the video output;
wherein the processing circuitry reconstructs the missing pixels by identifying coordinates of missing pixels in the current transformed frame, and processing, for only the missing pixel coordinates, the cached transformed frames to identify pixels at coordinates in the cached transformed frames having valid data and corresponding to one of the missing pixel coordinates, and, upon identifying a pixel having valid data at a coordinate in a cached transformed frame corresponding to a missing pixel coordinate, inserting the valid data at the missing pixel coordinate.

20. The apparatus of claim 19, wherein the processing circuitry sequentially processes the cached transformed frames.

21. The apparatus of claim 20, wherein the processing circuitry sequentially processes the cached transformed frames in reverse chronological order.

22. The apparatus of claim 19, wherein the processing circuitry caches corresponding transform matrices used to produce the motion stabilized transformed frames to compensate for one or more of camera movement and zooming.

23. The apparatus of claim 22, wherein the processing circuitry reconstructs the missing pixels by using, for each cached transformed frame processed, a corresponding cached transform matrix in an affine transformation to identify pixels at original coordinates in the cached transformed frames having valid data and corresponding to one of the missing pixel coordinates, and, upon identifying a pixel having valid data at an original coordinate in a cached transformed frame corresponding to a missing pixel coordinate, inserting the valid data at the missing pixel coordinate.

24. The apparatus of claim 22, wherein the processing circuitry identifies missing pixel coordinates in the cached transformed frames and flags the missing pixels to identify the missing pixels as not including valid data.

25. The apparatus of claim 24, wherein the processing circuitry flags the missing pixels before caching the cached transformed frames.

26. The apparatus of claim 19, wherein the processing circuitry maintains a count of cached transformed frames processed for the current transformed frame, and discontinues sequentially processing the cached transformed frames when the count reaches a predefined limit.

27. The apparatus of claim 26, wherein the processing circuitry mirrors pixels from the current transformed frame to reconstruct any missing pixels at missing pixel coordinates remaining after the count limit is reached.

\* \* \* \* \*